United States Patent
Weusthof et al.

(10) Patent No.: US 7,159,497 B2
(45) Date of Patent: Jan. 9, 2007

(54) LIGHT BEAM ALIGNMENT SYSTEM

(75) Inventors: Gerhard Josef Karl Weusthof, Tsuen Wan (HK); John Ka Ki Chan, Kowloon (HK)

(73) Assignee: Eastway Fair Company Ltd., Tortola (VG)

( * ) Notice: Subject to any disclaimer, the term of this patent is extended or adjusted under 35 U.S.C. 154(b) by 8 days.

(21) Appl. No.: 10/056,297

(22) Filed: Jan. 25, 2002

(65) Prior Publication Data

US 2003/0140758 A1 Jul. 31, 2003

(51) Int. Cl.
*B26D 7/00* (2006.01)
*B27B 5/18* (2006.01)

(52) U.S. Cl. .......................... 83/520; 83/490; 83/471.3

(58) Field of Classification Search ................. 83/520, 83/522.5, 581, 147.3, 490, 614, 939, 478, 83/522.15, 471.1, 123, 471.3, 521, 397, 477.1, 83/522, 471.2, 15; 318/138, 696, 313, 342, 318/362; 30/123, 388, 391, 471.2, 389, 520, 30/390; 362/119, 110; 322/28, 40, 38; 185/38; 310/156, 261

See application file for complete search history.

(56) References Cited

U.S. PATENT DOCUMENTS

| | | | | |
|---|---|---|---|---|
| 3,275,863 A | * | 9/1966 | Fodor | 310/166 |
| 3,555,325 A | * | 1/1971 | Inariba | 310/162 |
| 3,675,113 A | * | 7/1972 | Bader et al. | 322/28 |
| 4,227,105 A | | 10/1980 | Kumakura | |
| 4,648,610 A | * | 3/1987 | Hegyi | 280/11.19 |
| 4,677,328 A | | 6/1987 | Kumakura | |
| 4,924,125 A | * | 5/1990 | Clark | 310/67 R |
| 5,097,170 A | * | 3/1992 | Baines | 310/268 |
| 5,128,840 A | * | 7/1992 | Seki et al. | 362/473 |
| 5,345,495 A | * | 9/1994 | Black et al. | 379/27.01 |
| 5,375,495 A | | 12/1994 | Bosten et al. | |
| 5,461,790 A | | 10/1995 | Olstowski | |
| 5,580,093 A | | 12/1996 | Conway | |
| 5,675,899 A | | 10/1997 | Webb | |
| 5,857,762 A | * | 1/1999 | Schwaller | 362/473 |
| 5,862,727 A | * | 1/1999 | Kelly | 83/13 |
| 6,035,757 A | * | 3/2000 | Caluori et al. | 83/520 |
| 6,093,985 A | * | 7/2000 | Chen | 310/67 A |
| 6,104,096 A | * | 8/2000 | Hicks | 290/1 R |
| RE36,917 E | * | 10/2000 | Leininger | 290/54 |
| 6,153,957 A | * | 11/2000 | Takano | 310/71 |
| 6,236,177 B1 | * | 5/2001 | Zick et al. | 318/362 |

(Continued)

FOREIGN PATENT DOCUMENTS

WO WO 99/02310 * 1/1999

*Primary Examiner*—Boyer D. Ashley
*Assistant Examiner*—Ghassem Alie
(74) *Attorney, Agent, or Firm*—Brinks Hofer Gilson & Lione

(57) ABSTRACT

A saw such as a chop saw, a circular saw, a compound miter saw or a sliding compound miter saw having a rotatable saw blade is provided with a laser arbor alignment system. The laser arbor may include a power generator that generates power as the saw blade and the laser arbor are rotated by a spindle. The generator may include a stator comprising an electrical magnet or a permanent magnet mounted on a fixed portion of the saw. The other portion of the generator is a rotor comprising a coil that is rotated with the laser arbor to generate power for the laser. Power may also be provided to the laser by slip ring contacts from a stationary source to the laser arbor.

8 Claims, 2 Drawing Sheets

U.S. PATENT DOCUMENTS

| | | | |
|---|---|---|---|
| 6,259,233 B1 * | 7/2001 | Caamano | 322/89 |
| 6,407,466 B1 * | 6/2002 | Caamano | 290/52 |
| 6,481,322 B1 * | 11/2002 | Hsiung | 83/521 |
| 6,584,695 B1 * | 7/2003 | Chang | 30/391 |
| 2001/0029819 A1 * | 10/2001 | Okouchi | 83/13 |
| 2002/0149945 A1 * | 10/2002 | Liaw et al. | 362/472 |
| 2002/0170185 A1 * | 11/2002 | Konda et al. | 30/392 |
| 2002/0170404 A1 * | 11/2002 | Peot et al. | 83/478 |
| 2003/0071464 A1 * | 4/2003 | Chiu | 290/1 R |
| 2003/0097922 A1 * | 5/2003 | Chen | 83/520 |
| 2004/0194600 A1 * | 10/2004 | Wu et al. | 83/520 |

* cited by examiner

LIGHT BEAM ALIGNMENT SYSTEM

BACKGROUND OF THE INVENTION

1. Field of the Invention

The present invention relates to a saw having a light source alignment system that does not require internal batteries to power the light source.

2. Background Art

Miter saws, portable circular saws, radial arm saws, chop saws, and compound saws are used to precisely cut wood and other materials. For example, miter saws and compound saws are used to cut baseboards, crown moldings, cove moldings, and a wide variety of trim pieces and structural members to exact dimensions. Such circular saws generally have a blade that is rotated at a high rate of speed to cut workpieces. The blade is guarded by a retractable blade guard that covers the saw blade but is retracted as the blade is brought into contact with a workpiece. The workpiece is retained on a base and a turntable that, in conjunction with a fence, are used to position the workpiece to be cut by the saw.

Before cutting, workpieces are generally marked with a pencil at the intended cut location according to precise measurements to assure accuracy. A common problem with these types of saws is that it takes considerable skill and attention to consistently align the workpiece with the saw blade so that the edge of the saw blade cuts the workpiece at the desired location. With prior art saws, it has not been possible to know if the saw alignment is proper until the saw begins to cut the material. The workpiece may be ruined if it is not set up at the correct orientation when the saw blade contacts the workpiece.

A laser arbor for a circular saw has been proposed in U.S. Pat. No. 5,862,727 to Kelly. The Kelly patent discloses the use of a semiconductor laser arbor for a circular saw that is actuated by a centrifugal switch and directs a line of laser beam on a workpiece. The Kelly patent discloses a battery powered laser light source. One problem with reliance upon batteries is that the semiconductor laser light source draws substantial power from the batteries to illuminate the laser, resulting in limited battery life and requiring frequent battery changes. Similarly, U.S. Pat. No. 6,035,757 to Caluori et al. discloses a similar semiconductor laser light beam alignment device for a circular saw having a focusing lens that causes the laser beam to be directed to the blade cut line. The Caluori patent likewise relies upon a battery power source that is carried by the laser arbor. This system has the same problem of limited battery life as the Kelly patent.

The assignee of this application has marketed a battery power laser alignment device which is described in copending U.S. patent application Ser. No. 09/860,898 entitled "Miter Saw Having a Light Beam Alignment System" which is incorporated by reference herein for general background purposes.

Applicants have solved the battery life problem by their development of a laser alignment system that utilizes a power source external to the laser arbor.

SUMMARY OF THE INVENTION

According to one aspect of the present invention, a miter saw (or other circular saw) is provided that includes a motor with a spindle to which a blade is secured and rotated by the motor to cut a workpiece that is disposed on a turntable or saw table. The motor is part of a saw head assembly that is supported relative to the table by an arm. A laser or other directed light source (hereinafter referred to as "laser" or "light source") is mounted in a laser arbor housing that is secured to the spindle and rotated by the motor along with the blade. The light source emits a narrow beam of light from the housing to a location adjacent to the blade for checking the alignment of the blade with the workpiece. Power for the light source is provided by a source located outside the laser arbor housing.

The invention may also be defined as a laser arbor for a circular saw having a spindle that rotates the saw blade relative to a non-rotating portion of the saw. The laser arbor comprises a LED laser light and a circuit connected to the laser for providing power to the laser. The circuit provides power from a voltage source that includes a portion secured to the non-rotating portion of the saw.

According to another aspect of the invention, the circuit of the laser arbor for a circular saw may further comprise a generator having a rotor associated with the spindle and a stator associated with the non-rotating portion of the saw. Electrical energy is generated as the spindle rotates the rotor relative to the stator.

According to another aspect of the invention, the laser arbor for a circular saw may have an inductively coupled power source. The inductive power source may comprise a first induction coil inside the laser arbor that rotates with the arbor and a second induction coil mounted near the arbor that induces voltage in the first coil. The first induction coil is electrically connected to a power conditioning circuit that provides power directly to the light source. According to another aspect of the invention, the light source may be a LED laser.

Alternatively, the circuit may comprise a power source electrically connected by slip ring contacts that establish electrical contact between the power source and the circuit. The slip ring contacts may comprise a first set of contacts that rotate with the spindle and a second set of contacts that are stationary and contact the first set of contacts. The circuit further comprises a power conditioning circuit that provides power within a predetermined voltage range to the laser.

These and other aspects of the invention and advantages of the invention over the prior art will be better understood in view of the attached drawings and following detailed description provided below.

DETAILED DESCRIPTION OF THE PREFERRED EMBODIMENTS

Figure 1:
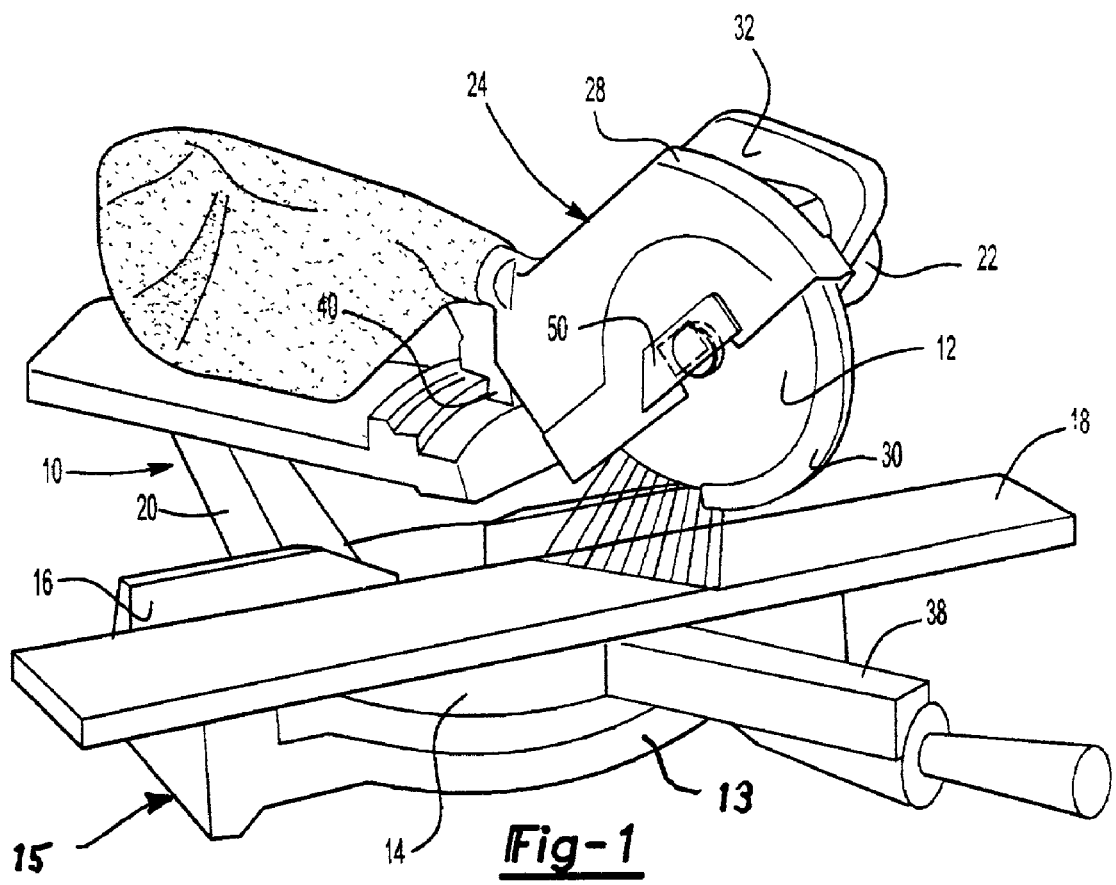
FIG. 1 is a perspective view of a sliding compound miter saw having a laser arbor including a power generator for powering the laser.

Referring now to FIG. 1, a saw 10 having a circular saw blade 12 is shown. The saw 10 also includes a base 13 and a turntable 14 that together comprise a supporting table generally referred to by reference numeral 15. A fence 16 is provided on the supporting table 15. A workpiece 18 is placed on the supporting table 15 and held against the fence 16 as the workpiece 18 is cut by the saw 10. An arm 20 connects the motor assembly 22 to the turntable 14. The motor assembly 22 forms a part of the saw head assembly, generally indicated by reference numeral 24. The motor assembly 22 drives the saw blade 12. The saw blade 12 is shielded by a fixed guard 28 and a retractable shield 30. A handle 32 is provided for manipulating the saw head assembly 24.

The saw 10 shown in the illustrated embodiment is a sliding compound miter saw having a miter angle adjustment mechanism 38 and a tilt adjustment mechanism 40. While the illustrated embodiment is of a sliding compound miter saw, the invention is equally applicable to other types of circular saws such as a simple miter saw, a compound miter saw, a chop saw, portable circular saw, or radial arm saw. The saw head assembly 24 is pivotally connected to the arm 20 and includes a spring (not shown) for biasing the saw head assembly 24 normally out of engagement with the workpiece 18.

When an operator is ready to make a cut with the saw 10, the operator grips the handle 32, depresses the trigger causing the circular saw blade 12 to rotate, and pulls it down toward the workpiece 18. The miter angle adjustment mechanism 38 permits the turntable 14 to rotate relative to the base 13 to change the miter angle of cut. The tilt adjustment mechanism 40 allows the saw head assembly 24 to be pivoted to adjust the inclination of the blade 12 relative to the supporting table 15.

Figure 2:
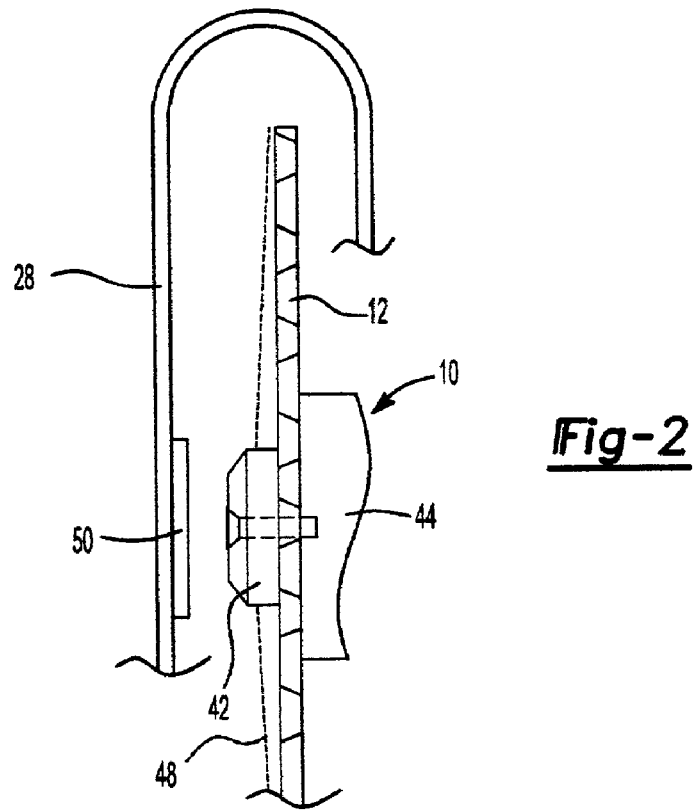
FIG. 2 is a schematic fragmentary view of a circular saw blade, laser arbor and blade guard to which a stator for a generator is secured.

Referring now to FIG. 2, a saw 10 having a laser arbor 42 is illustrated. The laser arbor 42 is mounted adjacent the saw blade 12 on the same spindle 44 as the saw blade. The laser arbor 42 directs a laser beam 48 outwardly from the laser arbor 42 as it is rotated by the spindle 44. The light beam is slightly angled toward the blade preferably at the top surface of the work piece where the blade cuts the work piece. While the light source is described as a laser, another light source such as a light emitting diode (LED) laser, focused electric light bulb based system or other small light could be used with the saw 10.

Referring now to both FIGS. 1 and 2, a stator 50 is secured to the fixed guard 28 near the laser arbor 42. The stator 50 may include an electrical magnet or permanent magnet that creates magnetic flux through which the laser arbor 42 is rotated to generate electricity, as will be more fully described below.

Figure 3:
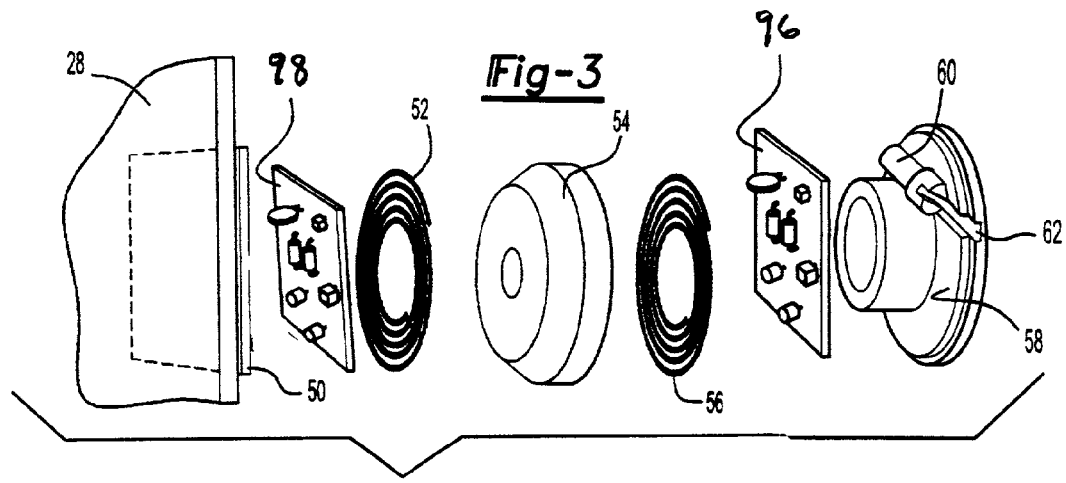
FIG. 3 is an exploded perspective view of a laser arbor including a fixed induction coil secured to the blade guard and a rotatable induction coil secured within the laser arbor.

Referring now to FIG. 3, one alternative embodiment of the invention is shown wherein a stationary induction coil 52 is included as part of the stator 50 that is mounted on the fixed guard 28. A housing 54 for the laser arbor encloses a rotating induction coil 56. The housing 54 and rotary induction coil 56 are assembled to a laser arbor washer 58 that supports a LED laser module 60. The laser module 60 directs a beam of light through a slot 62 formed on the washer 58. Electricity induced in the coil 56 is conditioned by a conventional inductively coupled power supply circuit of the type commonly used in electric toothbrushes or the like in order to power laser module 60. Stationary induction coil 52 is powered by an AC power source or a pulsed reversing polarity or on-off DC source that induces a corresponding current through the rotating induction coil 56 which is located within the magnetic field of coil 52.

Figure 4:
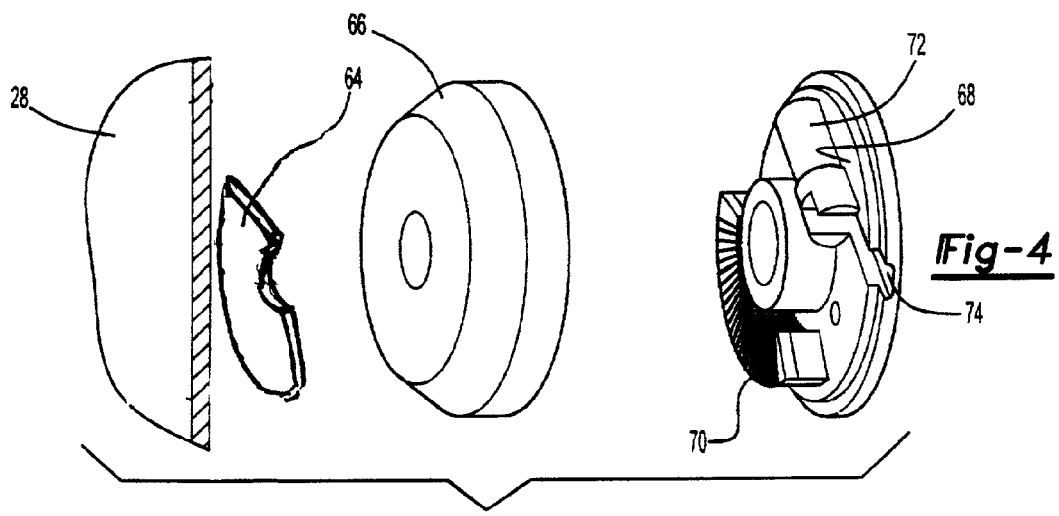
FIG. 4 is an exploded perspective view of a laser arbor including a generator having a permanent magnet stator connected to the blade guard and a arcuate coil section secured within the laser arbor.

Referring now to FIG. 4, another alternative embodiment is shown wherein a permanent magnet 64 is secured to the fixed guard 28. The permanent magnet 64 is preferably formed by a plurality of arcuate segments (not shown) of a ceramic permanent magnet formed of ferrite or other well-known magnetic ceramic material. A housing 66 is secured to a laser arbor washer 68. An arcuate coil 70 is mounted on the laser arbor washer 68. The coil 70 is rotated with the laser arbor module through the alternating polarity (N-S-N) flux created by permanent magnet 64 thereby generating electricity that is provided to the laser arbor module 72. Laser light is emitted through a slot 74 formed in the laser arbor washer 68.

Figure 5:
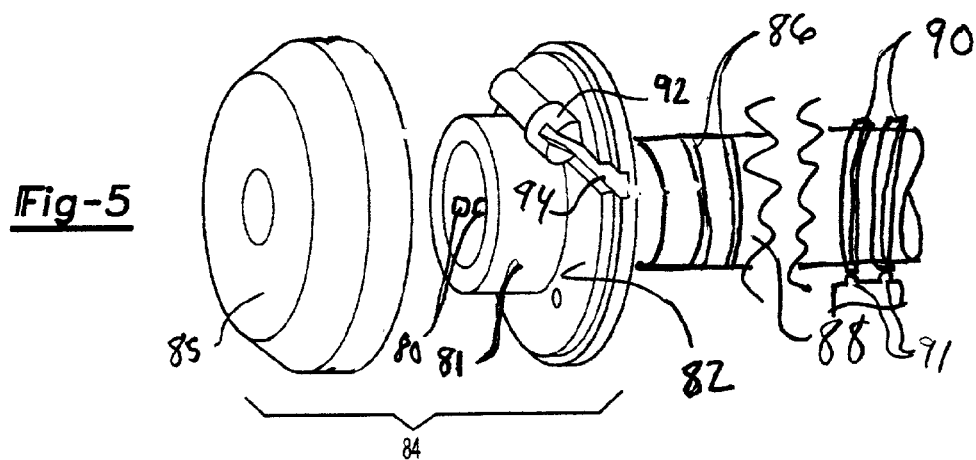
FIG. 5 is a diagrammatic view of a laser arbor having slip ring contacts for providing power to the laser.

Referring now to FIG. 5, yet another alternative embodiment is provided wherein a first set of contacts comprising contacts 80 that are provided on a hub 81 of a laser arbor washer 82 of a laser arbor 84. A housing 85 is provided for enclosing the component parts of the laser arbor 84. Contacts 86 are provided on the spindle 88 that maintain contact with the contacts 80. A pair of slip ring contacts 90 are provided on the spindle 88 at a location spaced from the laser arbor 84. The slip ring contacts 90 connect to contacts 91 and are electrically connected to the contacts 86. The laser module 92 is supported by a laser arbor washer 82 and directs a laser beam through a slot 94 formed in the laser arbor washer 82.

In each of the embodiments described above with reference to FIGS. 3–5, no batteries are required to provide power to the laser modules.

A power conditioning circuit may be provided by a circuit board 96 secured to the washer or could be built-in as part of laser modules. In FIG. 3, an AC pulse reversing circuit 98 is illustrated that may be provided as part of the power circuit.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A saw comprising:
   a motor having a spindle;
   a blade secured to the spindle and rotated by the motor to cut a workpiece;
   a laser arbor having a housing secured to the spindle for rotation with the blade;
   a light source disposed in the housing, the light source emitting a narrow beam of light adjacent to the blade for providing a visual indication of the alignment of the blade with the workpiece; and
   a generator electrically connected to the light source for providing power to the light source, wherein the generator includes a rotor associated with and rotated with the housing and a stator secured adjacent to the housing, the rotor being rotated by the motor relative to the stator for generating electrical power in the rotor for the light source, wherein the rotor has no electrical connections with a non-rotating portion of the saw.

2. The saw of claim 1 wherein the rotor is an electrical coil.

3. The saw of claim 2 wherein the stator is an electrical magnet.

4. The saw of claim 2 wherein the stator is a permanent magnet.

5. The saw of claim 2 wherein the rotor is electrically connected to a power conditioning circuit that provides power directly to the light source.

6. The saw of claim 1 wherein the light source is a LED laser.

7. The saw of claim 1 wherein the generator further comprises a power conditioning circuit that provides power within a predetermined voltage range to the light source.

8. A saw comprising:
  a motor having a spindle;
  a blade secured to the spindle and rotated by the motor to cut a workpiece;
    a laser arbor having a housing secured to the spindle for rotation with the blade;
  a light source disposed in the housing, the light source emitting a narrow beam of light adjacent the blade for providing a visual indication of the alignment of the blade with the workpiece; and a generator electrically connected to the light source for providing power produced in the spindle to the light source, the generator having a permanent magnet secured to a fixed guard and a coil rotated by the spindle, wherein the spindle has no electrical connections with a non-rotating portion of the saw.

* * * * *